US012803408B2

(12) United States Patent
Strijker et al.

(10) Patent No.: US 12,803,408 B2
(45) Date of Patent: Nov. 17, 2026

(54) SWITCHED MODE POWER SUPPLY HAVING A CURRENT SENSING ELEMENT

(71) Applicant: NXP USA, Inc., Austin, TX (US)

(72) Inventors: Joan Wichard Strijker, Wijchen (NL); Jeroen Kleinpenning, Malden (NL)

(73) Assignee: NXP USA, Inc., Austin, TX (US)

( * ) Notice: Subject to any disclaimer, the term of this patent is extended or adjusted under 35 U.S.C. 154(b) by 334 days.

(21) Appl. No.: 18/171,214

(22) Filed: Feb. 17, 2023

(65) Prior Publication Data

US 2024/0283364 A1 Aug. 22, 2024

(51) Int. Cl.

| | |
|---|---|
| ***H02M 1/00*** | (2007.01) |
| ***H02M 3/155*** | (2006.01) |
| ***H02M 3/335*** | (2006.01) |

(52) U.S. Cl.

CPC .......... *H02M 1/0009* (2021.05); *H02M 3/155* (2013.01); *H02M 3/335* (2013.01)

(58) Field of Classification Search

CPC ..... H02M 3/156; H02M 3/155; H02M 1/0009

See application file for complete search history.

(56) References Cited

U.S. PATENT DOCUMENTS

| | | | | |
|---|---|---|---|---|
| 5,886,512 A * | 3/1999 | Becerra | H02M 3/155 | 323/901 |
| 8,093,826 B1 * | 1/2012 | Eagar | H05B 45/3725 | 315/307 |
| 10,433,378 B1 * | 10/2019 | Del Croce | H02M 3/156 | |
| 11,539,287 B2 * | 12/2022 | Eggermont | H05B 45/375 | |
| 2006/0214603 A1 * | 9/2006 | Oh | H05B 45/3725 | 315/246 |
| 2009/0134856 A1 * | 5/2009 | Rahman | G01R 19/0092 | 323/282 |

(Continued)

FOREIGN PATENT DOCUMENTS

| | | |
|---|---|---|
| CN | 103326546 B | 10/2015 |
| CN | 108390559 A | 8/2018 |
| CN | 208401738 U | 1/2019 |

OTHER PUBLICATIONS https://www.merriam-webster.com/dictionary/between (Year: 2025).*

(Continued)

*Primary Examiner* — Gustavo A Rosario-Benitez

(57) ABSTRACT

One example discloses a switched mode power supply (SMPS), comprising: an inductor configured to supply an inductor current to a load; a charging circuit configured to increase an inductor current during a primary stroke time window, and to decrease the inductor current during a secondary stroke time window; wherein the charging circuit is configured to end the primary stroke when the inductor current reaches a high current limit; wherein the charging circuit is configured to set the secondary stroke time window to a predicted duration; wherein the charging circuit is configured to automatically start the primary stroke after the predicted duration and measure the inductor current at the end of a detection window; wherein if the inductor current is below a low limit at the end of the detection window, then the charging circuit is configured to shorten the predicted duration; and wherein if the inductor current is above the low limit at the end of the detection window, then the charging circuit is configured to lengthen the predicted duration.

13 Claims, 10 Drawing Sheets

(56) References Cited

U.S. PATENT DOCUMENTS

| | | | | |
|---|---|---|---|---|
| 2014/0177289 | A1* | 6/2014 | Chen | H02M 3/33515 363/21.13 |
| 2015/0251542 | A1 | 9/2015 | Mensah-Brown et al. | |
| 2015/0311804 | A1* | 10/2015 | Fang | H05B 45/3725 363/16 |
| 2015/0334795 | A1* | 11/2015 | Strijker | H10D 62/124 315/291 |
| 2016/0020692 | A1* | 1/2016 | Castelli | H02M 1/4208 323/205 |
| 2016/0128148 | A1* | 5/2016 | Sasaki | G02F 1/1336 315/186 |
| 2022/0311338 | A1* | 9/2022 | Fang | H02M 3/158 |

OTHER PUBLICATIONS

Leng, Zhaoxia et al.; "A Simple Model Predictive Control for Buck Converter Operating in CCM"; 2017 IEEE International Symposium on Predictive Control of Electrical Drives and Power Electronics; Pilsen, Czech Republic; Sep. 2017; pp. 19-24.

Texas Instruments; "Understanding Buck Power Stages in Switchmode Power Supplies"; Application Report SLVA057; https://www.ti.com/lit/an/slva057/slva057.pdf; Mar. 1999; 36 pages.

Liu, Chao-Hsuan, et al.; "SAR-Controlled Adaptve Off-Time Technique Without Sensing Resistor for Achieving High Efficiency and Accuracy LED Lighting System"; Jun. 2010; IEEE Transactions on Circuits and Systems; vol. 57, No. 6; pp. 1384-1394.

* cited by examiner

SWITCHED MODE POWER SUPPLY HAVING A CURRENT SENSING ELEMENT

The present specification relates to systems, methods, apparatuses, devices, articles of manufacture and instructions for controlling a switched mode power supply (SMPS).

SUMMARY

According to an example embodiment, a switched mode power supply (SMPS), comprising: an inductor configured to supply an inductor current to a load; a charging circuit configured to increase an inductor current during a primary stroke time window, and to decrease the inductor current during a secondary stroke time window; wherein the charging circuit is configured to end the primary stroke when the inductor current reaches a high current limit; wherein the charging circuit is configured to set the secondary stroke time window to a predicted duration; wherein the charging circuit is configured to automatically start the primary stroke after the predicted duration and measure the inductor current at the end of a detection window; wherein if the inductor current is below a low limit at the end of the detection window, then the charging circuit is configured to shorten the predicted duration; and wherein if the inductor current is above the low limit at the end of the detection window, then the charging circuit is configured to lengthen the predicted duration.

In another example embodiment, the SMPS is operating in a continuous conduction mode (CCM).

In another example embodiment, the low current limit can be set between a level close to zero and a level close to the high current limit.

In another example embodiment, the charging circuit is configured to measure the inductor current during the primary stroke time window; and the charging circuit is configured not to measure the inductor current during the secondary stroke time window.

In another example embodiment, the charging circuit includes a controller, a current sensing element, an inductor, a diode and a switch.

In another example embodiment, the controller is configured to measure the inductor current using the current sensing element.

In another example embodiment, during the primary stroke the switch is configured to both conduct the inductor current and enable the current sensing element to measure the inductor current.

In another example embodiment, during the secondary stroke the switch does not conduct the inductor current and thus the current sensing element cannot measure the inductor current.

In another example embodiment, the controller is configured to set the switch to a closed state during the primary stroke, and to set the switch to an open state during the secondary stroke.

In another example embodiment, the current sensing element is a resistor.

In another example embodiment, a first end of the resistor is coupled to the switch and a second end of the resistor is coupled to a ground potential.

In another example embodiment, the controller is configured to derive the inductor current from a voltage across the resistor.

In another example embodiment, the load is a capacitor charged by the inductor current from the charging circuit.

In another example embodiment, a first end of the capacitor is coupled to the inductor and a second end of the capacitor is coupled to the diode.

In another example embodiment, further comprising a transformer with isolated windings with the primary winding coupled to the switch and the secondary winding coupled to the diode and to the capacitor.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
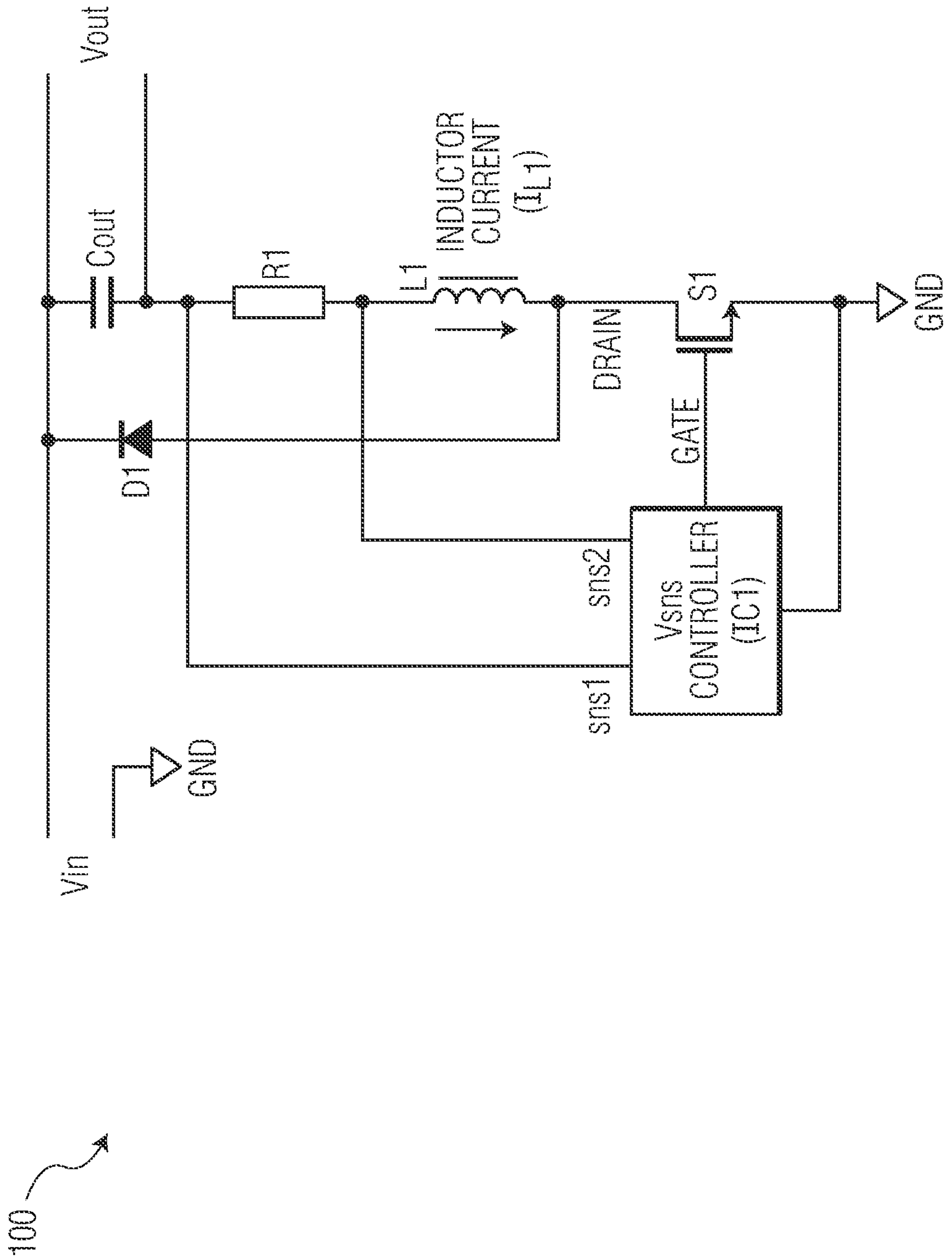
FIG. 1 PRIOR ART
FIG. 1 represents a prior art switched mode power supply (SMPS).

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Switched mode power supplies (SMPS) have proven to be a more efficient, lighter and smaller form factor circuit for powering a variety of devices, as compared to linear power supplies. SMPSs essentially include a switch (S1) (e.g. MOSFET or other transistor) that continually switches between just two states (i.e. on or off). In some applications, SMPS circuits are used in automotive applications such as for charging the DC-link capacitor of the traction inverter to the high voltage (e.g. 400V, 800V, etc.) of the battery pack.

In an on-state (i.e. primary-stroke), the SMPS charges a storage device (e.g. an inductor), and in an off-state (i.e. secondary-stroke) the SMPS discharges the storage device by a load. A switching-cycle is defined as one primary-stroke time plus one secondary-stroke time. Further, as herein discussed, charging or discharging of a capacitor results in a change in voltage stored by the capacitor, and an inductor's current change is a result of the inductor magnetizing and demagnetizing. The terms charging and discharging however are often and commonly used for both capacitors and inductors. In this document the "common use" phrasing has been applied for both because both elements are storage devices: the capacitor stores a voltage and the inductor stores a current.

FIG. 1 represents a prior art switched mode power supply (SMPS) 100. This SMPS 100 includes an input voltage (Vin), an output voltage (Vout), an output capacitor (Cout), a sense resistor (R1), an inductor (L1), a switch (S1), a controller (IC1), a diode (D1), and a ground (GND).

The SMPS charges the output capacitor (Cout) by the inductor (L1) current. The switch (S1) in on-state charges the inductor to a peak current. The inductor discharges when the switch (S1) is in off-state and the current flows via diode (D1), also known as a free-wheel diode, in the loop containing the inductor L1, the output capacitor (Cout) and diode (D1). The inductor current ($I_{L1}$) is regulated by the controller (IC1) based on a measured voltage across sense resistor (R1), (i.e. Vsns=Vsns1−Vsns2, and $I_{L1}$=Vsns/R1).

The output capacitor's (Cout) current in on-state of the switch (S1) is substantially equal to the inductor current ($I_{L1}$) flowing through the inductor (L1), the sense resistor (R1) and the switch (S1). The output capacitor's (Cout) current in off-state of the switch (S1) is substantially equal to the inductor current ($I_{L1}$) flowing through the inductor (L1) and the diode (D1). The output capacitor's (Cout) current can include a current from a load receiving the output voltage (Vout).

Figure 2:
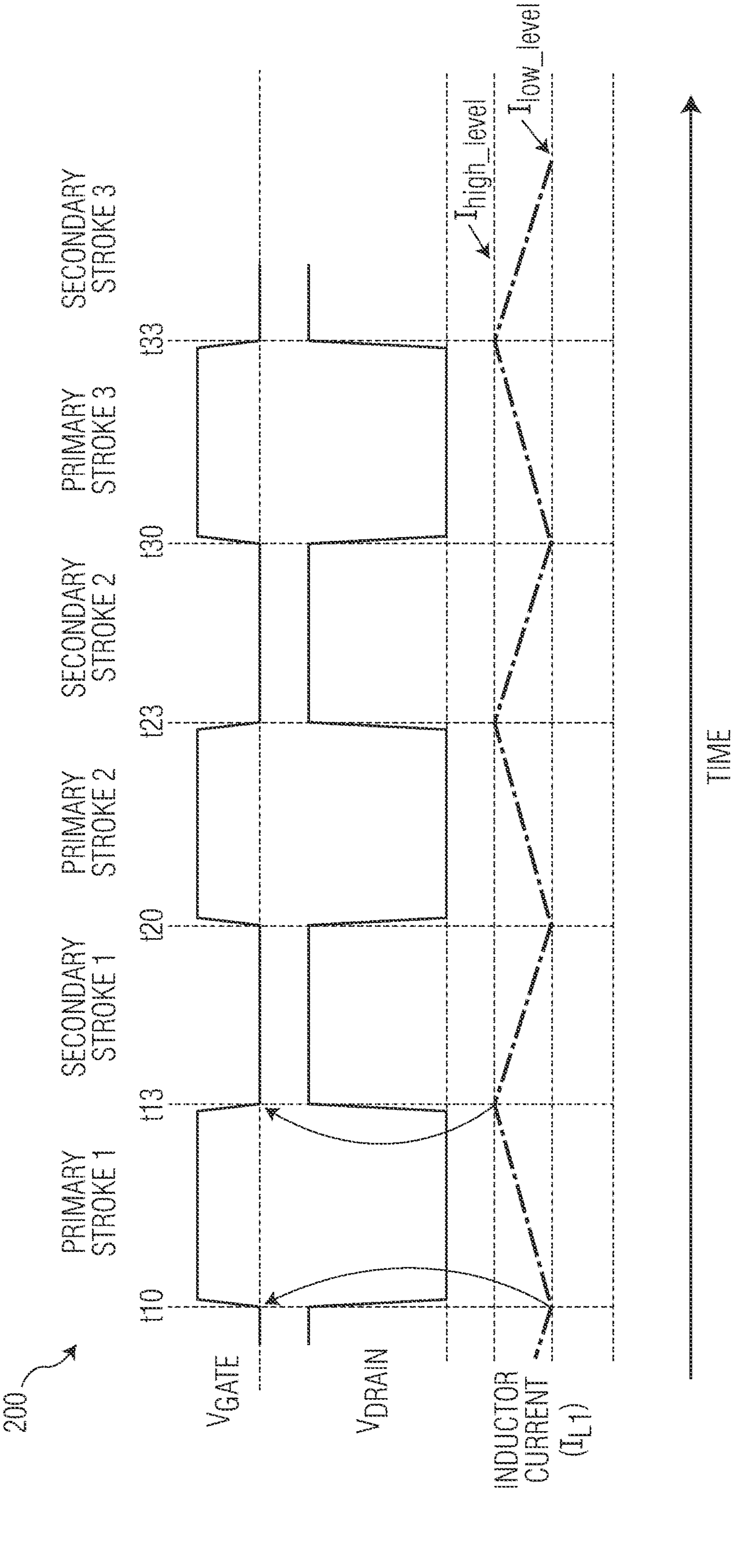
FIG. 2 PRIOR ART
FIG. 2 represents a prior art operational timing diagram for the prior art SMPS.

FIG. 2 represents a prior art operational timing diagram 200 for the prior art SMPS 100. The timing diagram 200 shows the switch's (S1) gate voltage (Vgate), the switch's (S1) drain voltage (Vdrain), the inductor current ($I_{L1}$), a set of switching cycles 1, 2, 3. Each of the switching cycles include a primary stroke time window (i.e. $I_{L1}$ from t10 to t13 when switch (S1) is "on" and thus L1 charging) and a secondary stroke time window (i.e. $I_{L1}$ from t13 to t20 when switch (S) "off" and thus L1 discharging).

As soon as the inductor current ($I_{L1}$) reaches a low value ($I_{low\_level}$) at time=t10, the switch (S1) is switched on (i.e. the primary stroke time window) via the gate signal (Vgate) from the controller (IC1) thereby starting the switching cycle (1). The inductor current ($I_{L1}$) then increases to a high value ($I_{high\_level}$) at time=t13 at which the controller (IC1) turns the switch (S1) off (secondary stroke time window). The inductor current ($I_{L1}$) drops again to the low value ($I_{low\_level}$), leading to the next switching cycle (2).

The controller (IC1) determines the high value ($I_{high\_level}$) and the low value ($I_{low\_level}$) of the current by sensing a voltage (V) across sense resistor (R1) using the controller's input pins sns1 and sns2 (see FIG. 1). V(R1)=V(sns1)−V(sns2). Two input pins are required and their input voltages are between ground voltage (GND) and the input voltage (Vin). The two input voltages are high voltages (e.g. 400V, 800V, etc.) and require that the controller (IC1) be designed for high voltage operation, which can be expensive.

The inductor current ($I_{L1}$) is controlled using a continuous conduction mode (CCM), since the inductor current ($I_{L1}$) is always larger than zero (i.e. the current flow is continuous). An advantage of CCM over discontinuous conduction mode (DCM) designs is that the average current is larger for the same peak inductor (L1) current and charging of the output capacitor in this automotive application will happen faster. In this design, the inductor current ($I_{L1}$) information is available continuously.

Now discussed are CCM SMPS circuits where the inductor current ($I_{L1}$) information need not be continuously available. In these CCM SMPS circuits, the inductor current ($I_{L1}$) is measured only during part of the SMPS's switching cycle. Such CCM SMPS circuits are simpler, sensing of the current over the sense resistor (R1) is at low voltage, and the sensing is referred to ground and only one sense input is needed on the controller (IC1).

Figure 3:
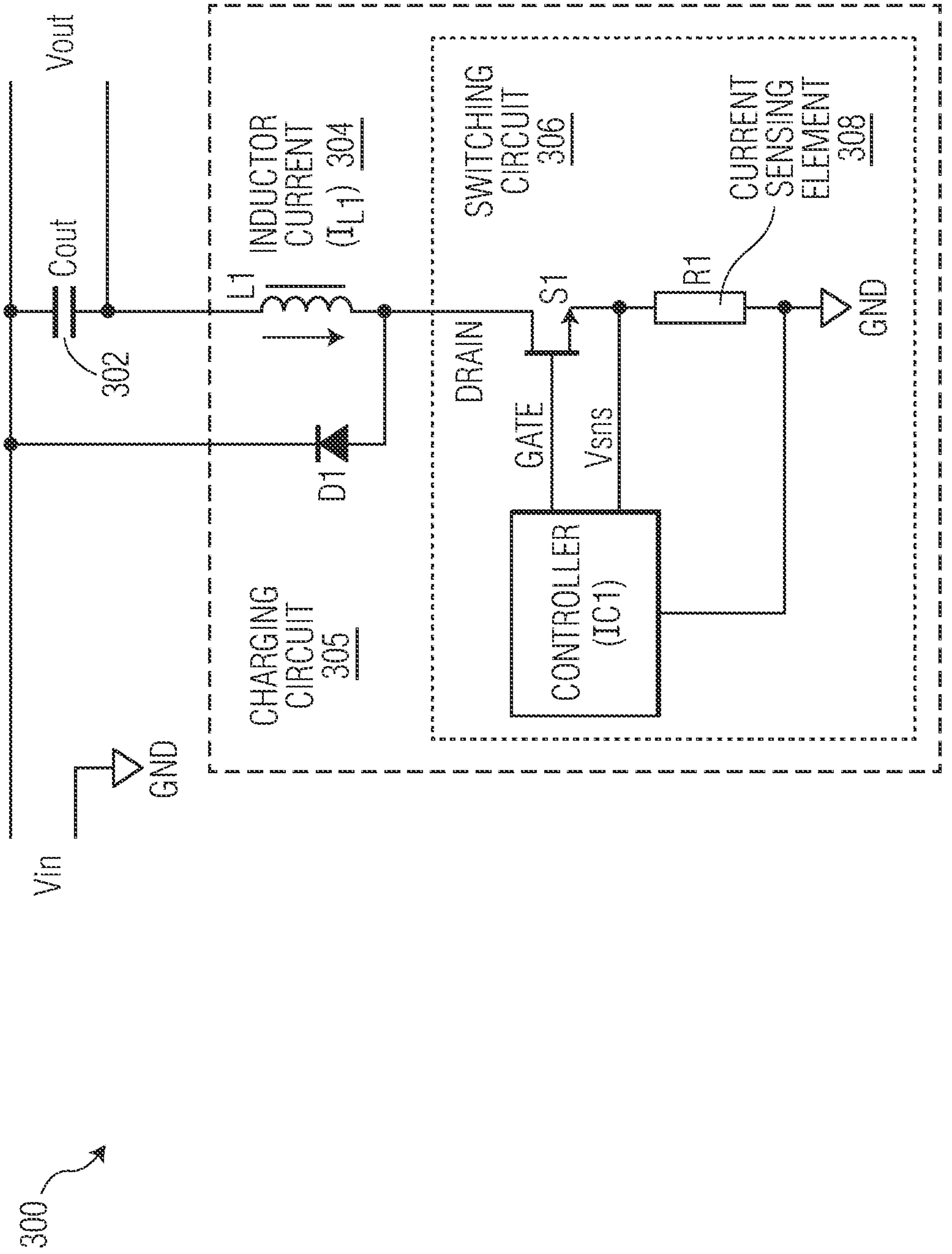
FIG. 3 represents a first example of a modified SMPS.

FIG. 3 represents a first example of a modified SMPS 300. The modified SMPS 300 includes an input voltage (Vin), an output voltage (Vout) to be coupled to a load (not shown), a output capacitor (Cout) 302 configured to carry an inductor current 304, a charging circuit 305, an inductor (L1), a diode (D1), and a switching circuit 306. The switching circuit 306 includes a current sensing element 308 (e.g. sense resistor (R1)), a switch (S1), and a controller (IC1). Ground (GND) is also shown. Note, in some example embodiments, the output capacitor (Cout) 302 is itself the objective load and the capacitor 302.

The modified SMPS 300 uses the output capacitor (Cout) 302 as a load. To charge the capacitor 302, the switching circuit 306 is configured to supply an increasing charging current 304 to the capacitor 302 during a primary stroke time window and a decreasing charging current 304 during a secondary stroke time window using the switch (S1).

Here in FIG. 3, unlike FIG. 1, the current sensing element 308 (e.g. sense resistor (R1)) is placed on a low-voltage side in the modified SMPS 300 that is between the switch (S1) and the ground (GND). An additional benefit is that the controller's (IC1) current sense input (Vsns) is now a single pin with a sense voltage with respect to the (GND) pin of the controller.

However, in the modified SMPS 300 the current sensing element 308 (e.g. sense resistor (R1)) is now on a side of the switch (S1) opposite to the output capacitor (Cout) 302, the inductor current 304 information is only available during the primary stroke time window when the switch (S1) is closed/conductive.

Since an on-time of the modified SMPS 300 may vary from 0.1% to 99.9% depending on the input voltage (Vin) and the capacitor voltage (Vout), there still needs to be a way to constantly adjust a length of the secondary stroke time window so as to properly charge the output capacitor (Cout) 302 with a current between the high value ($I_{high\_level}$) and the low value ($I_{low\_level}$). Such a way is now discussed below.

Figure 4:
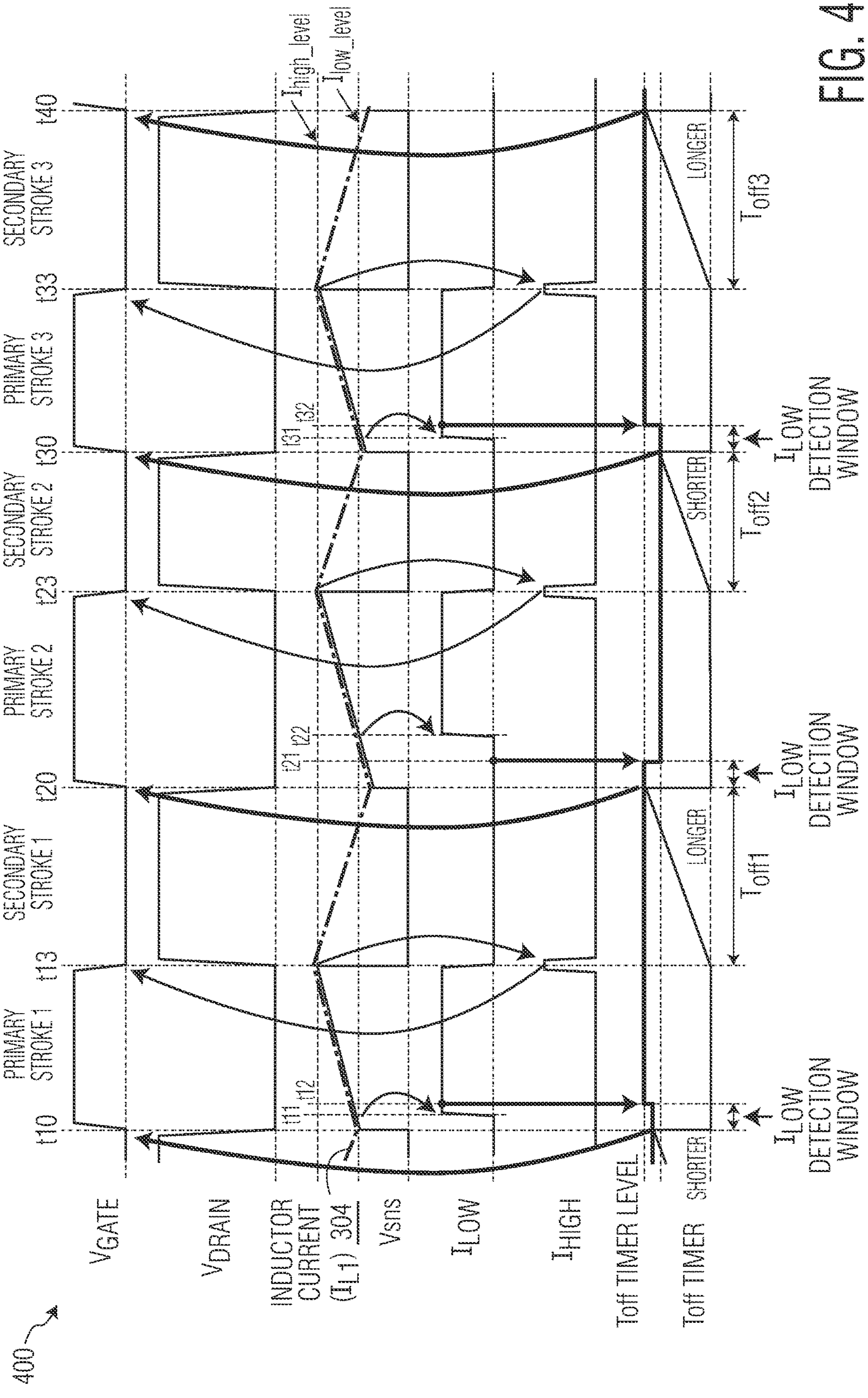
FIG. 4 represents an operational timing diagram for the first example of the modified SMPS.

FIG. 4 represents an operational timing diagram 400 for the first example of the modified SMPS 300. Since the current sensing element 308 (e.g. sense resistor (R1)) is on the low-side of the switch (S1), Vsns can only monitor the inductor current ($I_{L1}$) between times t=t10 and t=t13, but not between times t=t13 and t=t20. Thus, ending the primary stroke time window can still be done based on direct sensing of the inductor current ($I_{L1}$), such as discussed in FIG. 1.

However, a duration of the secondary stroke time window now becomes problematic (i.e. when to start the primary stroke time window again), since the controller (IC1) now has no way to directly sense the inductor current ($I_{L1}$). A solution to this lack of information is now presented that defines the secondary stroke time window using a variable timer (i.e. that controls an off-time (Toff) of the switch (S1) and an $I_{low}$ detection window.

As shown in FIG. 4, when the secondary stroke time window ends (i.e. $T_{off}$ window ends), the controller (IC1) automatically turns the switch (S1) on which enables the controller (IC1) to again have visibility as to the inductor current 304 ($I_{L1}$) using the current sensing element 308 (e.g. sense resistor (R1)). At this time, the $I_{low}$ detection window begins (i.e. t10 to t12, t20 to t21, t30 to t32, etc.) as shown and the controller determines the inductor current 304.

If the inductor current 304 ($I_{L1}$) is below (e.g. at t21) the low current level ($I_{low\_level}$) then the controller (IC1) shortens the secondary stroke time window (Toff) so as to begin a next primary stroke sooner. However, if the inductor current 304 is at or above (e.g. at t12 or t32) the low current level ($I_{low\_level}$) then the controller (IC1) lengthens the secondary stroke time window (Toff) so as to begin a next primary stroke later.

In other words, if the inductor current 304 ($I_{L1}$) in the time window t10 to t12 remains below the $I_{low\_level}$, the Toff timer duration is shortened. At time t=t11 (t11 is inside the mentioned time window), the low current level is exceeded, so for the secondary stroke 1, Toff 1 is increased by making the Toff timer duration longer.

For the next primary stroke (primary stroke 2) the $I_{low\_level}$ current is exceeded at time t=t22. As t22 is outside the t20 to t21 window, for the next secondary stroke (secondary stroke 2), the Toff2 time is decreased by making the Toff timer duration shorter. Thus, by continuously increasing and decreasing a duration of the secondary stroke time window (Toff), the low level current will be controlled around the $I_{low\_level}$, (just above or just below) resulting in a continuous current mode (CCM) operation through the inductor (L1) even though the switch (S1) is blocked during the secondary stroke time window.

Thus the switching circuit 306 is configured to end the primary stroke time window (i.e. for the first switching cycle) when the inductor current reaches a first limit (e.g. $I_{high\_level}$) which the current sensing element 308 (e.g. sense resistor (R1)) can measure/monitor since the switch (S1) is closed. However, since the switch (S1) is open during the secondary stroke, the controller (ICI) is configured to set the secondary stroke time window to a predicted (e.g. estimated) duration wherein the inductor current decreases until the $I_{low\_level}$ current.

The controller (IC1) is configured to automatically re-start the primary stroke time window (i.e. second switching cycle) and measure the inductor current 304 after the predicted Toff duration using the current sensing element 308 (e.g. sense resistor (R1)) since the switch (S1) is now closed again.

As discussed, if the inductor current 304 is below a second limit (e.g. $I_{low\_level}$) after the $I_{low}$ detection window, then the controller is configured to shorten the predicted duration so that next primary stroke with increase of the inductor current can begin sooner. However; if the inductor current 304 is above the second limit after the $I_{low}$ detection window, then the charging circuit 305 is configured to lengthen the predicted duration wherein the inductor current decreases until the $I_{low\_level}$ current.

Figure 5:
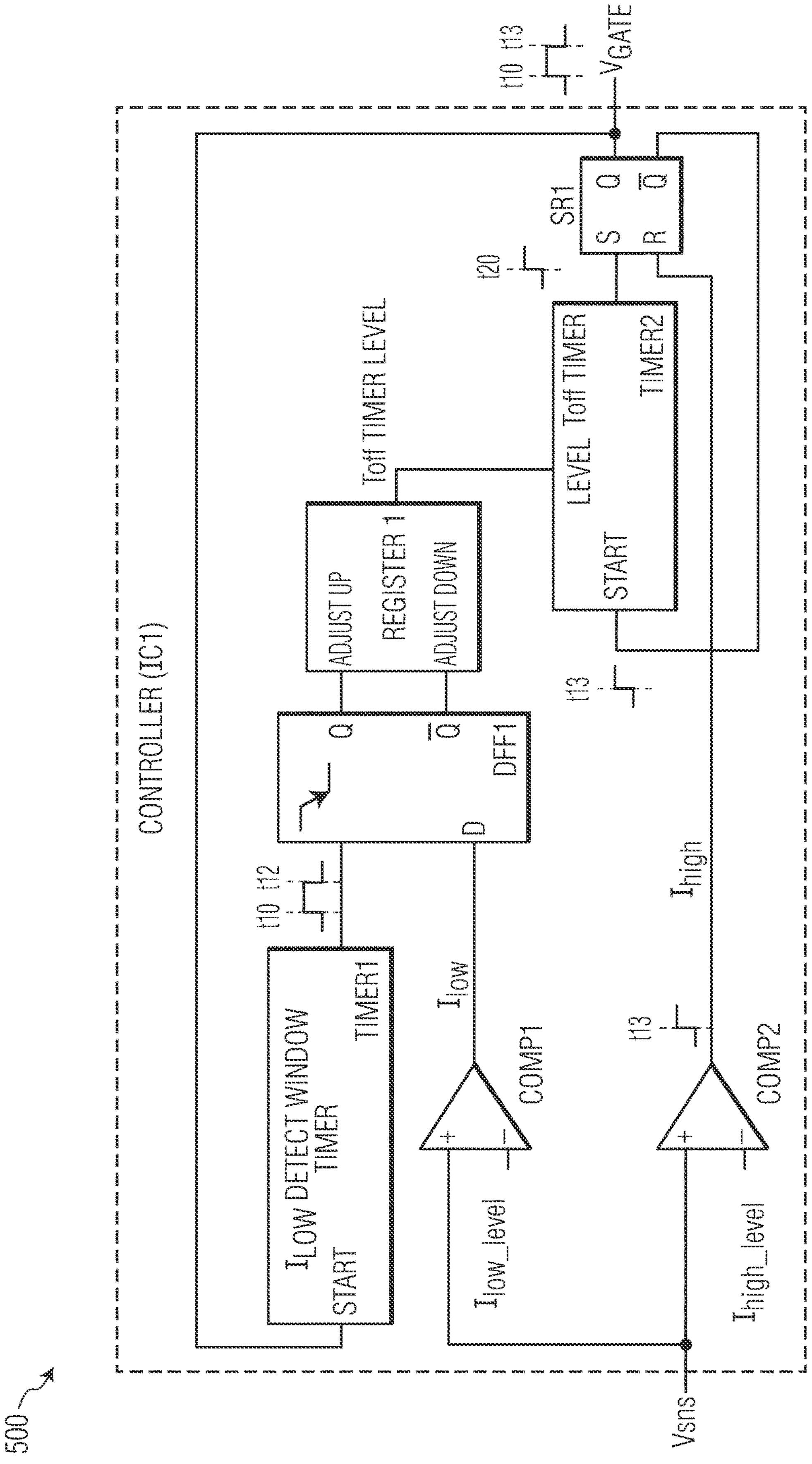
FIG. 5 represents an example of a controller for the first example of the modified SMPS.

FIG. 5 represents an example of a controller 500 for the first example of the modified SMPS 300. The low ($I_{low\_level}$) and high ($I_{high\_level}$) currents are sensed by comparators Comp1 and Comp2. When the high current ($I_{high\_level}$) level is reached, set reset flip flop SR1 is reset, turning off the gate signal. When the Toff timer elapses, set reset flip flop SR1 is set, turning on the Vgate signal. This starts a timer, Timer 1, which creates the $I_{low}$ detection window t10 to t12. If before the end of the $I_{low}$ detection window the $I_{low}$ signal becomes high, the output of D-flipflop DFF1 is set and the Toff timer level is adjusted to a higher value in Register1. The off timer, Timer 2, starts at t=t13 and when the timer reaches the Toff timer level at t=t20, SR1 is set, starting a next SMPS cycle. The timers and register can be implemented by analog or digital circuits.

Figure 6:
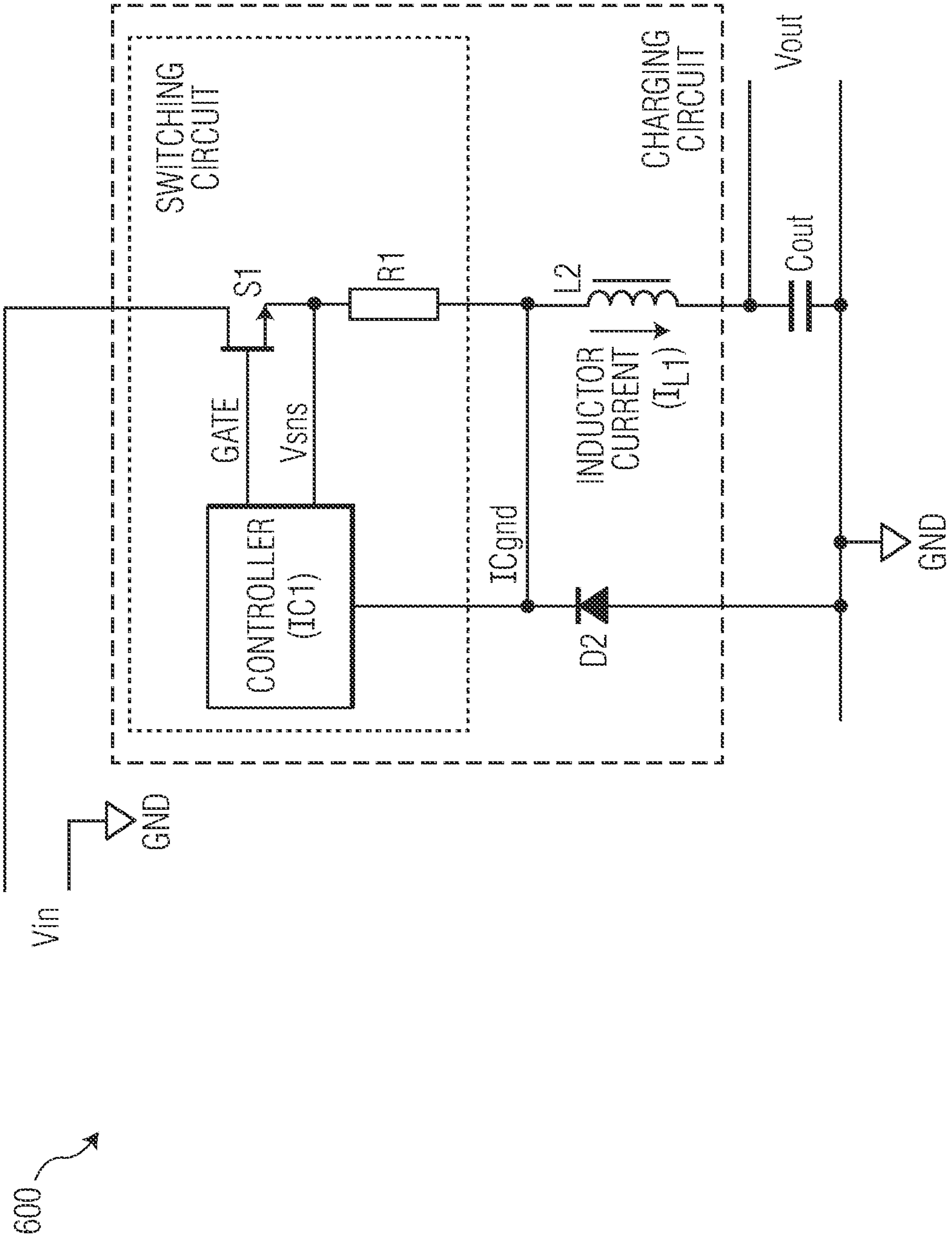
FIG. 6 represents a second example of the modified SMPS.

FIG. 6 represents a second example 600 of the modified SMPS. Here the capacitor voltage Vout is now referred with respect to the ground (GND) instead of Vin, however, the inductor current 304 monitoring and control is the same as in FIG. 4. Only the controller's ground (ICgnd), is not the modified SMPS's ground (GND) anymore.

Figure 7:
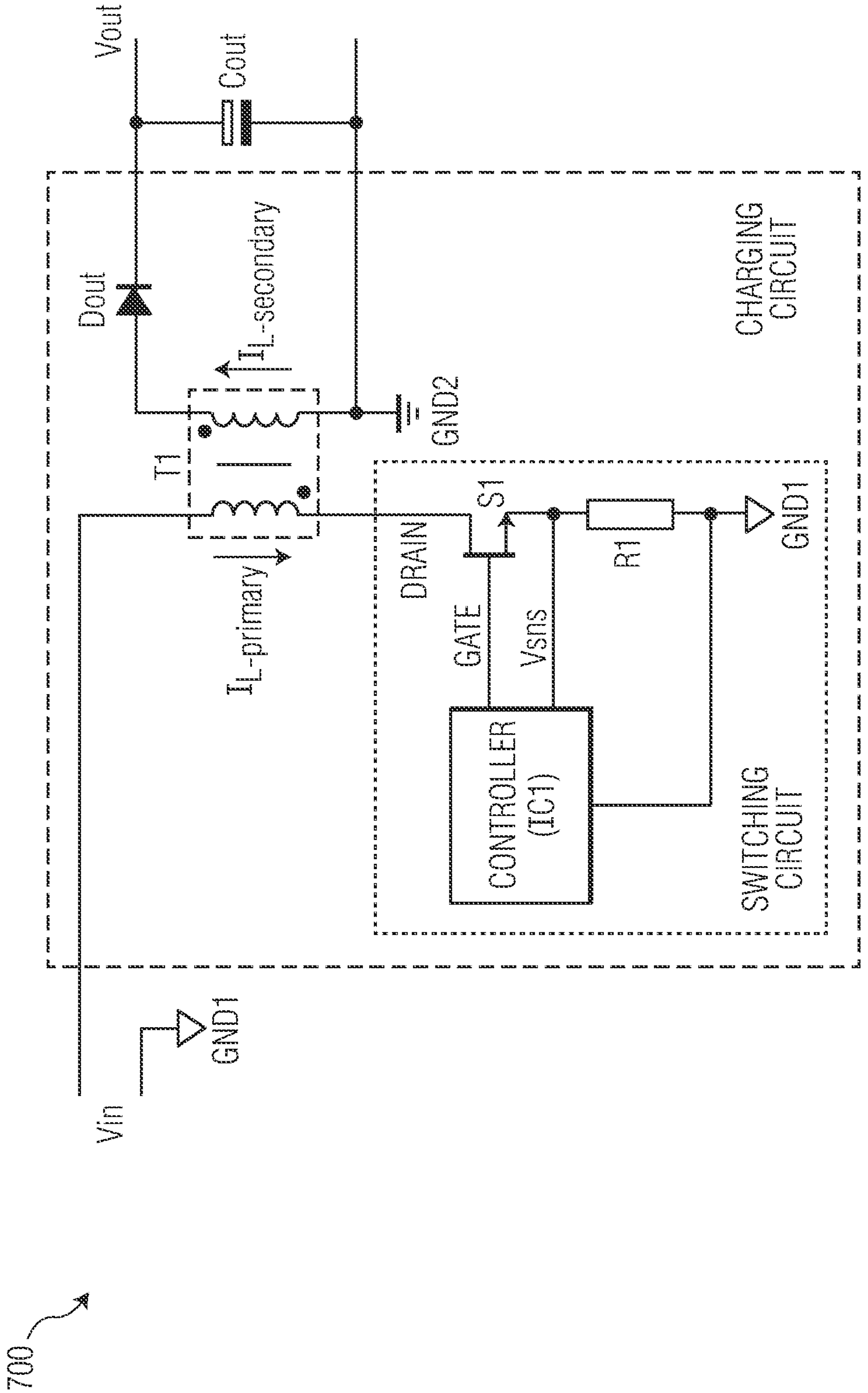
FIG. 7 represents a third example of the modified SMPS.

FIG. 7 represents a third example 700 of the modified SMPS. Here the modified SMPS now includes an isolated output by using two coupled inductors (e.g. a transformer with isolated windings). As before the inductor current 304 monitoring and control is the same as in FIG. 4. The two coupled inductors are for "galvanic isolation".

Figure 8:
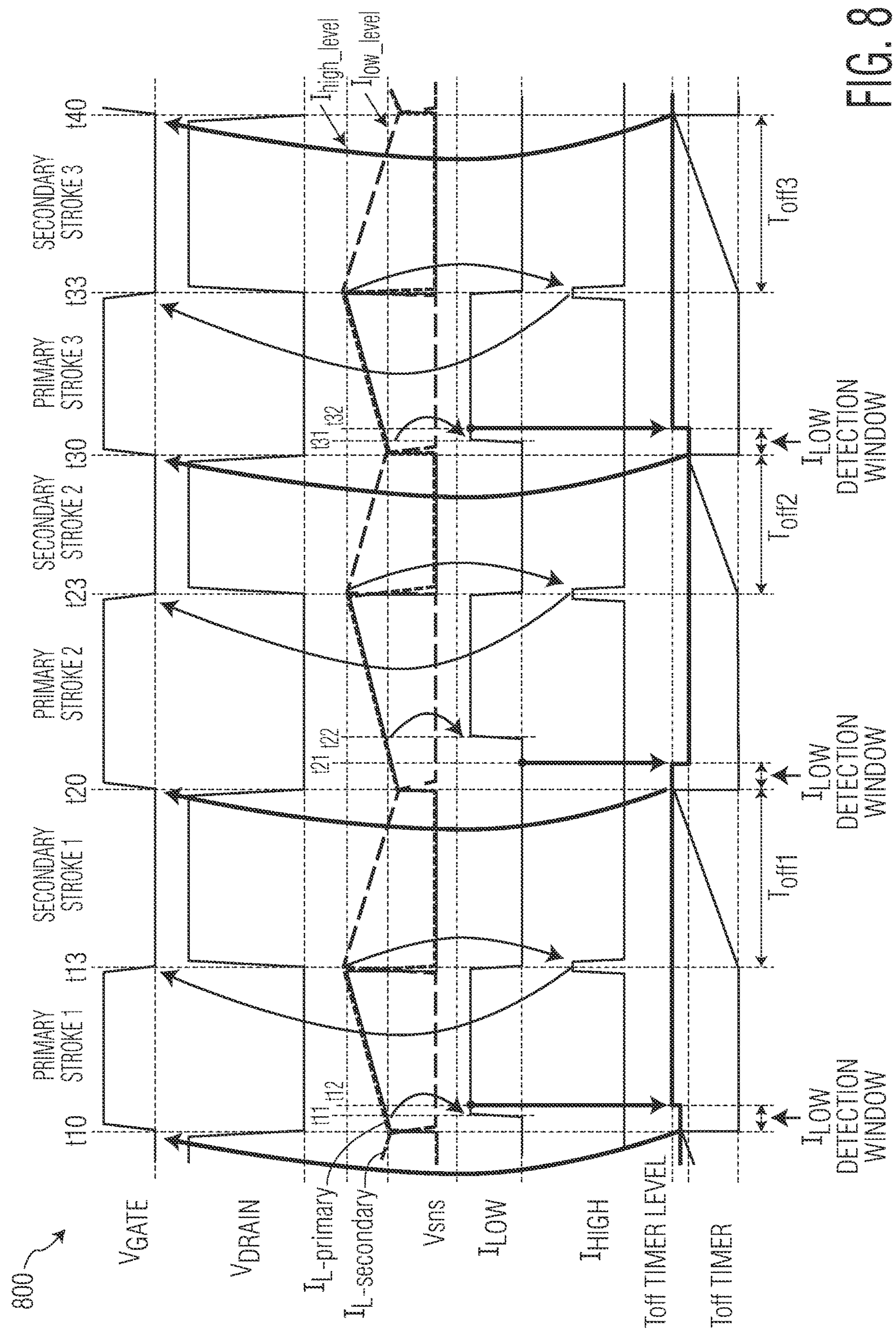
FIG. 8 represents an operational timing diagram for the third example of the modified SMPS.

FIG. 8 represents an operational timing diagram 800 for the third example 700 of the modified SMPS. The transformer's primary ($I_{L\text{-}primary}$) and secondary ($I_{L\text{-}secondary}$) current waveforms are shown. The third example 700 of the modified SMPS is also considered to be a continuous conduction mode (CCM) SMPS since a sum of the primary and secondary inductor currents is continuous, but not zero.

Figure 9:
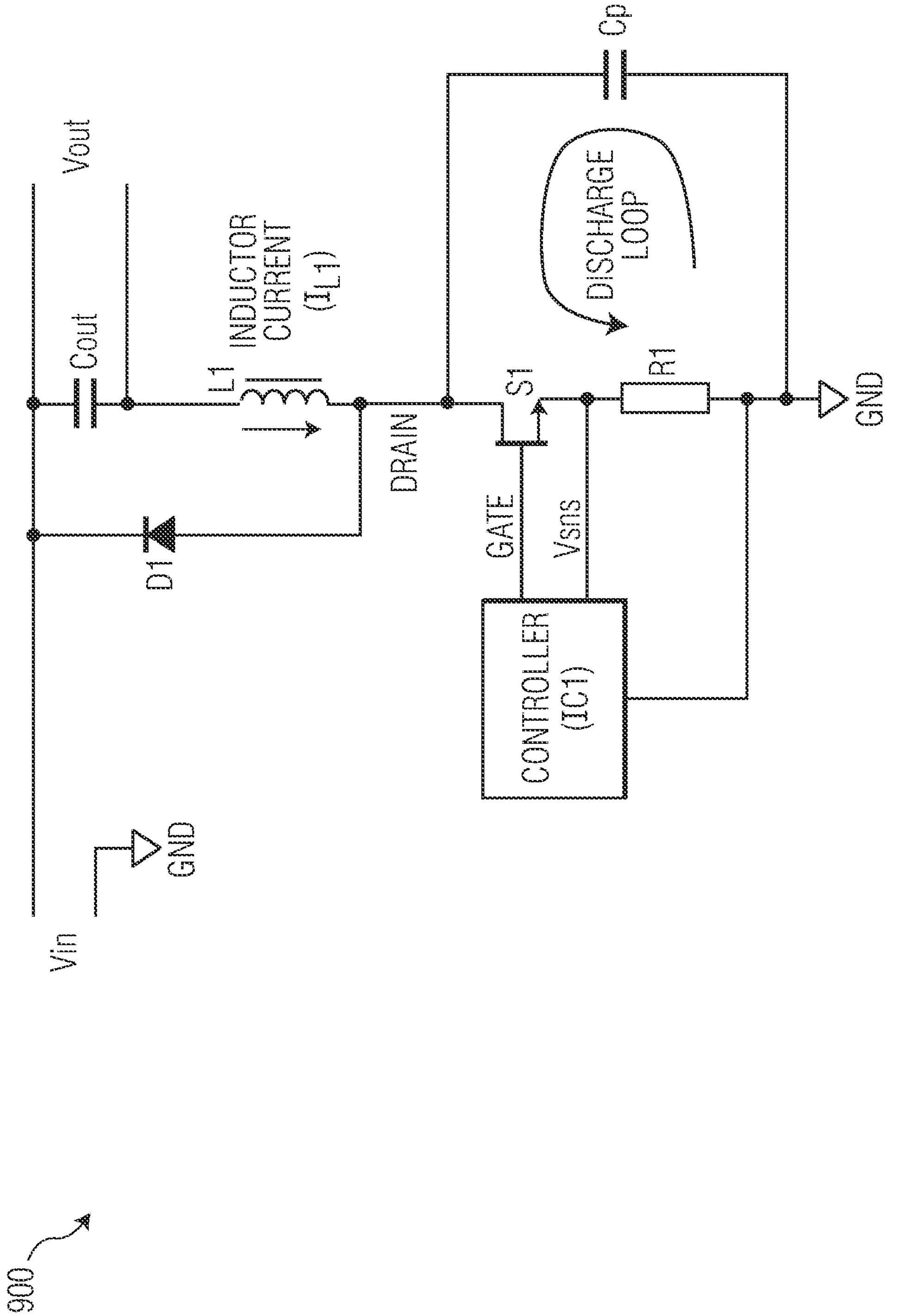
FIG. 9 represents an addition to the first example of the modified SMPS.

FIG. 9 represents an addition 900 to the first example of the modified SMPS. Here capacitance Cp is added to or is drawn in the circuit diagram. Capacitance Cp can be either a bulk capacitance added for EMI reduction, or a parasitic capacitance present in the modified SMPS.

Figure 10:
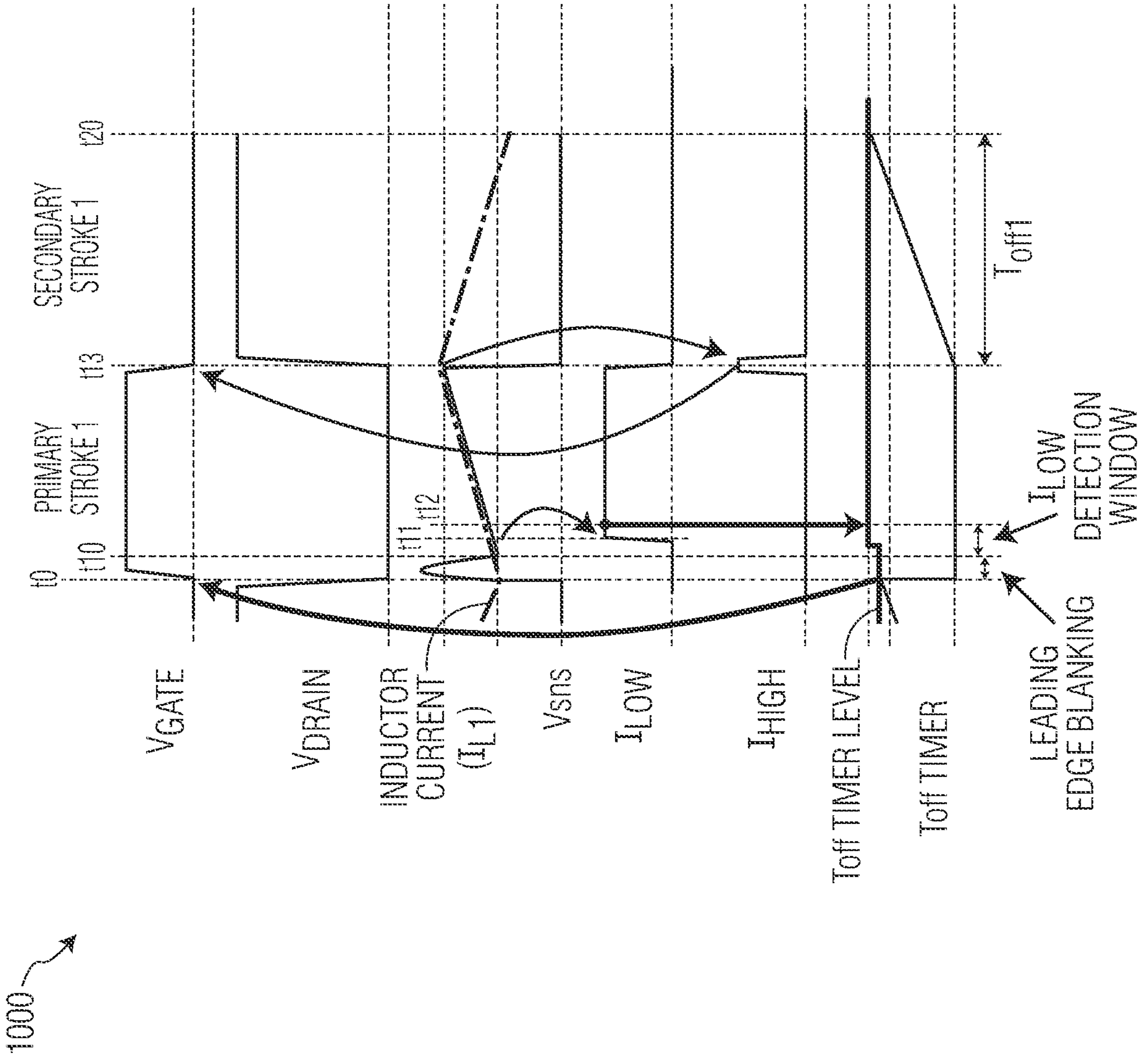
FIG. 10 represents a more detailed operational timing diagram for the addition to the first example of the modified SMPS.

FIG. 10 represents a more detailed operational timing diagram 1000 for the addition 900 to the first example of the modified SMPS. At the start of the primary stroke time window, the modified SMPS discharges the Cp capacitance, creating a voltage spike on across the current sensing element 308 (e.g. sense resistor (R1)) and is registered by the controller's (IC1) sense voltage (Vsns). The spike is drawn in time window t0 to t10.

To remedy this glitch on Vsns, the controller (IC1) defines a leading edge blanking time (i.e. time window t0 to t10). So while the primary stroke still starts at time t=t0, the $I_{low}$ detection window now starts after the leading edge blanking time (time window to t0 t10).

This blocks Vsns from detecting the spike voltage. The high current and low current comparator outputs are also blanked during the leading edge blanking time to prevent the controller (IC1) from being triggered as well.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A switched mode power supply (SMPS), comprising:

an inductor configured to supply an inductor current to a load;

a charging circuit configured to increase the inductor current during a primary stroke time window, and to decrease the inductor current during a secondary stroke time window;

wherein the charging circuit includes a current sensing element and a switch;

wherein a first end of the current sensing element is directly coupled to a first end of the switch and a second end of the current sensing element is directly coupled to a ground potential;

wherein a second end of the switch is directly coupled to the inductor;

wherein the charging circuit is configured to end the primary stroke time window when the inductor current reaches a high current limit;

wherein the charging circuit is configured to set the secondary stroke time window to a predicted duration;

wherein the charging circuit is configured to automatically start the primary stroke time window after the predicted duration and measure the inductor current at the end of a detection window, and wherein the charging circuit is configured to begin the detection window following a leading edge blanking time at the start of the primary stroke time window, the leading edge blanking time having a duration set to mitigate a voltage spike across the current sensing element at the start of the primary stroke time window;

wherein if the inductor current is below a low limit at the end of the detection window, then the charging circuit is configured to shorten the predicted duration; and wherein if the inductor current is above the low limit at the end of the detection window, then the charging circuit is configured to lengthen the predicted duration.

2. The SMPS of claim 1:

wherein the SMPS is operating in a continuous conduction mode (CCM).

3. The SMPS of claim 1:

wherein the low limit can be set between a level close to zero and a level close to the high current limit.

4. The SMPS of claim 1:

wherein the charging circuit is configured to measure the inductor current during the primary stroke time window; and wherein the charging circuit is configured not to measure the inductor current during the secondary stroke time window.

5. The SMPS of claim 1:

wherein a controller is configured to measure the inductor current using the current sensing element.

6. The SMPS of claim 1:

wherein during the primary stroke time window the switch is configured to both conduct the inductor current and enable the current sensing element to measure the inductor current.

7. The SMPS of claim 1:

wherein during the secondary stroke time window the switch does not conduct the inductor current and thus the current sensing element cannot measure the inductor current.

8. The SMPS of claim 1:

wherein a controller is configured to set the switch to a closed state during the primary stroke time window, and to set the switch to an open state during the secondary stroke time window.

9. The SMPS of claim 1:

wherein the current sensing element is a resistor.

10. The SMPS of claim 9:

wherein a controller is configured to derive the inductor current from a voltage across the resistor.

11. The SMPS of claim 1:

wherein the load is a capacitor charged by the inductor current from the charging circuit.

12. The SMPS of claim 11:

wherein a first end of the capacitor is directly coupled to the inductor and a second end of the capacitor is directly coupled to a diode.

13. The SMPS of claim 1:

wherein the charging circuit includes a switch, a diode, and a capacitor;

wherein the inductor is a first inductor;

further comprising a second inductor coupled to the first inductor so as to form a transformer;

wherein the first inductor is directly coupled to the switch; and wherein the second inductor is directly coupled to the diode and to the capacitor.

* * * * *